(12) United States Patent
Chen et al.

(10) Patent No.: US 7,651,352 B1
(45) Date of Patent: Jan. 26, 2010

(54) CARD CONNECTOR

(75) Inventors: Ming-Chiang Chen, Tu-Cheng (TW); Yin-Lung Wu, Tu-Cheng (TW); Bing-Tao Yang, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 12/314,460

(22) Filed: Dec. 11, 2008

(51) Int. Cl.
*H01R 13/62* (2006.01)
(52) U.S. Cl. ..................................................... 439/159
(58) Field of Classification Search ................ 439/152, 439/157, 160, 159
See application file for complete search history.

(56) References Cited

U.S. PATENT DOCUMENTS

2004/0242040 A1* 12/2004 Miyazawa et al. .......... 439/159

* cited by examiner

*Primary Examiner*—Neil Abrams
*Assistant Examiner*—Phuong Nguyen
(74) *Attorney, Agent, or Firm*—Rosenberg, Klein & Lee

(57) ABSTRACT

A card connector adapted for receiving an electronic card has an insulating housing having a receiving recess. A plurality of terminals is received in the insulating housing and protruded into the receiving recess for contacting the electronic card. An eject mechanism is disposed in the insulating housing and beside the receiving recess. A locking element is mounted in the insulating housing and has a locking plate. The locking plate has a locking portion protruded into the receiving recess. The locking portion is capable of being pressed downwardly by the inserted electronic card and elastically released to engage with a recess of the electronic card when the electronic card is fully inserted into the receiving recess. A cover is coupled with the insulating housing.

3 Claims, 4 Drawing Sheets

CARD CONNECTOR

BACKGROUND OF THE INVENTION

1. Field of the Invention

The present invention relates to a card connector, and particularly to a card connector with a compact structure for reliably fixing an inserted electronic card.

2. The Related Art

With electronic technology increasingly developing, electronic devices, such as cellular phones, personal digital assistants (PDAs) and the like, have developed towards multifunction and miniaturization. Accordingly, card connectors mounted in the electronic devices are required to reduce volumes thereof for meeting present demands. The card connector generally has an eject mechanism for withdrawing an inserted electronic card. The eject mechanism has an elastic locking piece for fixing the electronic card. Related U.S. application Ser. No. 09/832,190, filed Apr. 11, 2001, entitled "Card Connector", which is incorporated herein by reference, teaches an eject mechanism that has the elastic locking piece. The elastic locking piece is urged to move to engage with a recess of the electronic card for fixing the electronic card. However, such structure of the eject mechanism with the elastic locking piece is complicated for manufacture. Furthermore, the elastic locking piece may be deformed to interfere with other components in long usage duration so as to affect normal insertion and retraction of the electronic card.

SUMMARY OF THE INVENTION

Accordingly, an object of the present invention is to provide a card connector with a compact structure for reliably fixing an inserted electronic card. The card connector has an insulating housing having a receiving recess. A plurality of terminals are received in the insulating housing and protruded into the receiving recess for contacting the electronic card. An eject mechanism is disposed in the insulating housing and beside the receiving recess. A locking element mounted in the insulating housing and has a locking plate mounted to a bottom of the receiving recess. The locking plate has a locking portion protruded upwards. The locking portion is capable of being pressed downwardly by the inserted electronic card and elastically released to engage with a recess of the electronic card when the electronic card is fully inserted into the receiving recess. A cover is coupled with the insulating housing.

As described above, the locking element is simple and independently mounted in the insulating housing, which not only reduces manufacture complexity, but also avoids interfering with other components because of deformation in long usage duration. In addition, the locking element is disposed under the electronic card and can be pressed downwards by the electronic card during insertion and retraction operation, which is capable of retaining the electronic card for avoiding the electronic card falling out due to unexpected external force.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
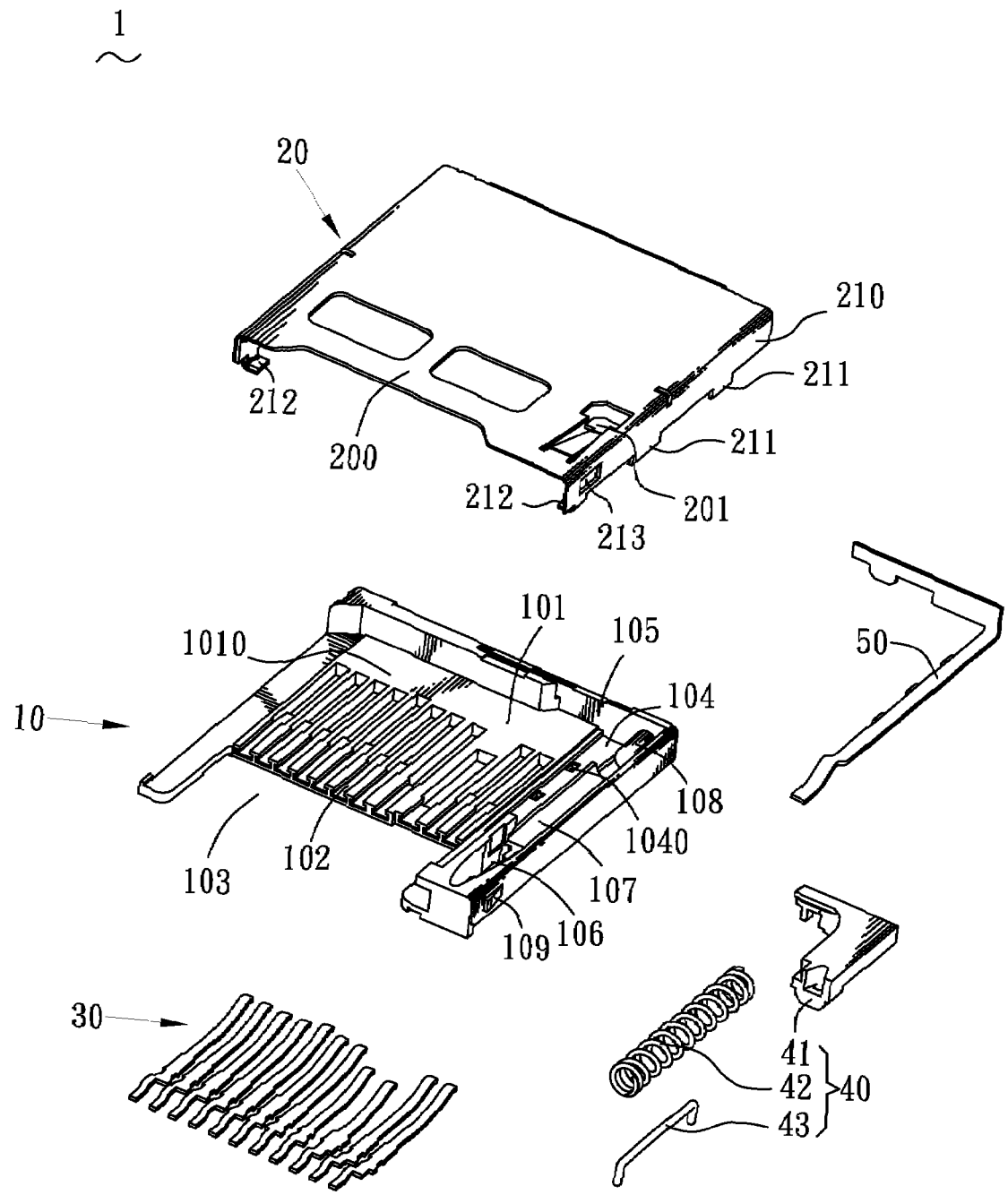
FIG. 1 is an exploded, perspective view of a card connector according to an embodiment of the present invention.
Figure 2:
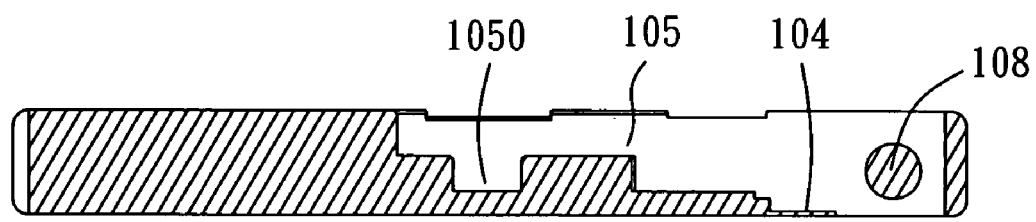
FIG. 2 is a cross-sectional view of an insulating housing of the card connector shown in FIG. 1.

With reference to FIG. 1 and FIG. 2, a card connector 1 of an embodiment according to the present invention is shown. The card connector 1 includes an insulating housing 10, a plurality of terminals 30 received in the insulating housing 10, an eject mechanism 40, a locking element 50 and a cover 20 coupled with the insulating housing 10.

The insulating housing 10 is substantially a rectangular shape and defines a front end, a rear end, a left side and a right side. A top of the insulating housing 10 is recessed downwardly to form a receiving recess 101. The receiving recess 101 passes through the left side and the front end of the insulating housing 10, and defines a bottom 1010. The bottom 1010 has a plurality of terminal grooves 102 extending frontward and rearward for receiving the terminals 30, and a gap 103 at a front thereof. The terminal grooves 102 communicate with the gap 103. A right side of the bottom 1010 of the receiving recess 101 has a locking recess 104. The locking recess 104 extends frontward and rearward, and has a plurality of locking holes 1040 at a bottom thereof. The locking holes 1040 are arranged in alignment with one another. The insulating housing 10 has a slot 105 near the rear end thereof, extending leftward and rightward and communicating with the locking recess 104. The slot 105 is narrow and has a bottom higher than that of the locking recess 104. In this embodiment, an end of a sidewall of the slot 105 adjacent to the locking recess 104 is opened to communicate with the receiving recess 161. The bottom of the slot 105 has a fixing aperture 1050 away from the locking recess 104. The right side of the insulating housing 10 has a heard-shaped recess 106, a sliding groove 107 and a positioning portion 108, arranged in alignment with one another and adjacent to the locking recess 104. A right surface of the insulating housing 10 has a buckling lump 109 near a front end thereof.

The cover 20 coupled with the insulating housing 10 has a covering plate 200 and a pair of lateral plates 210 extending downwardly from two opposite sides of the covering plate 200. The covering plate 200 may be punched inwards to form a buckling piece 201 for buttoning an inserted electronic card (not shown). Each of the lateral plates 210 extends downwards to form two inserting pieces 211 for inserting into a printed circuit board (PCB) for fixing the card connector 1, and a buckling tab 212 bent to abut a bottom of the insulating housing 10 after assembly. A mating hole 213 is formed at the right lateral plate 210 of the cover 20 for mating with the buckling lump 109.

The eject mechanism 40 mounted in the insulating housing 10 has a sliding portion 41, a spring 42 and a connecting rob 43. The sliding portion 41 is placed in the sliding groove 107. One end of the connecting rob 43 is received in the sliding portion 41, and the other end of the connecting rob 43 is inserted into the heard-shaped recess 106. The spring 42 is positioned by the positioning portion 108 and rests against an end of the sliding portion 41 opposite to the connecting rob 43.

Figure 3:
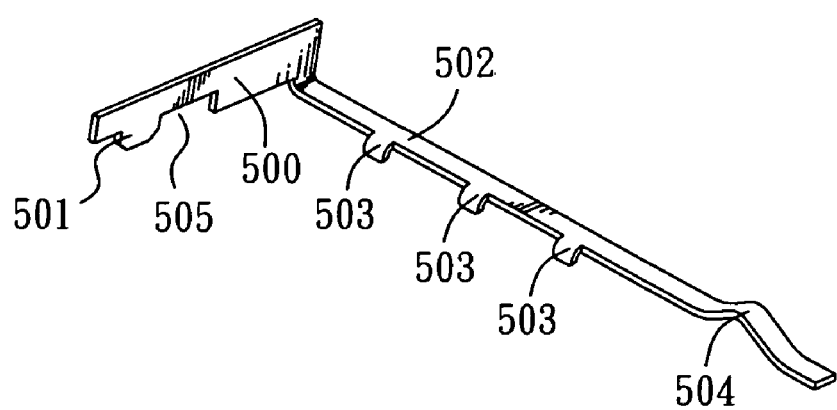
FIG. 3 is a perspective view of a locking element of the card connector shown in FIG. 1.

Please refer to FIG. 1 and FIG. 3, the locking element 50 has a holding plate 500, with a bottom edge having a mating gap 505 at one end thereof, received in the slot 105. The mating gap 505 has a fixing piece 501 at an upper edge thereof corresponding to the fixing aperture 1050 for fixing the locking element 50 to the insulating housing 10. The bottom edge of the holding portion 500 is extended substantially perpendicular to the holding portion 500 to form a locking plate 502 at the other end thereof. The locking plate 502 is an elongated shape and received in the locking recess 104. A side of the locking plate 502 adjacent to the fixing piece 501 protrudes downwards to form a plurality of protrusions 503 corresponding to the locking holes 1040 for securing the locking element 50 to the insulating housing 10. A portion of the locking plate 502 adjacent to a free end thereof is arched to form a locking portion 504 of substantially smooth inverted-V shape.

Figure 4:
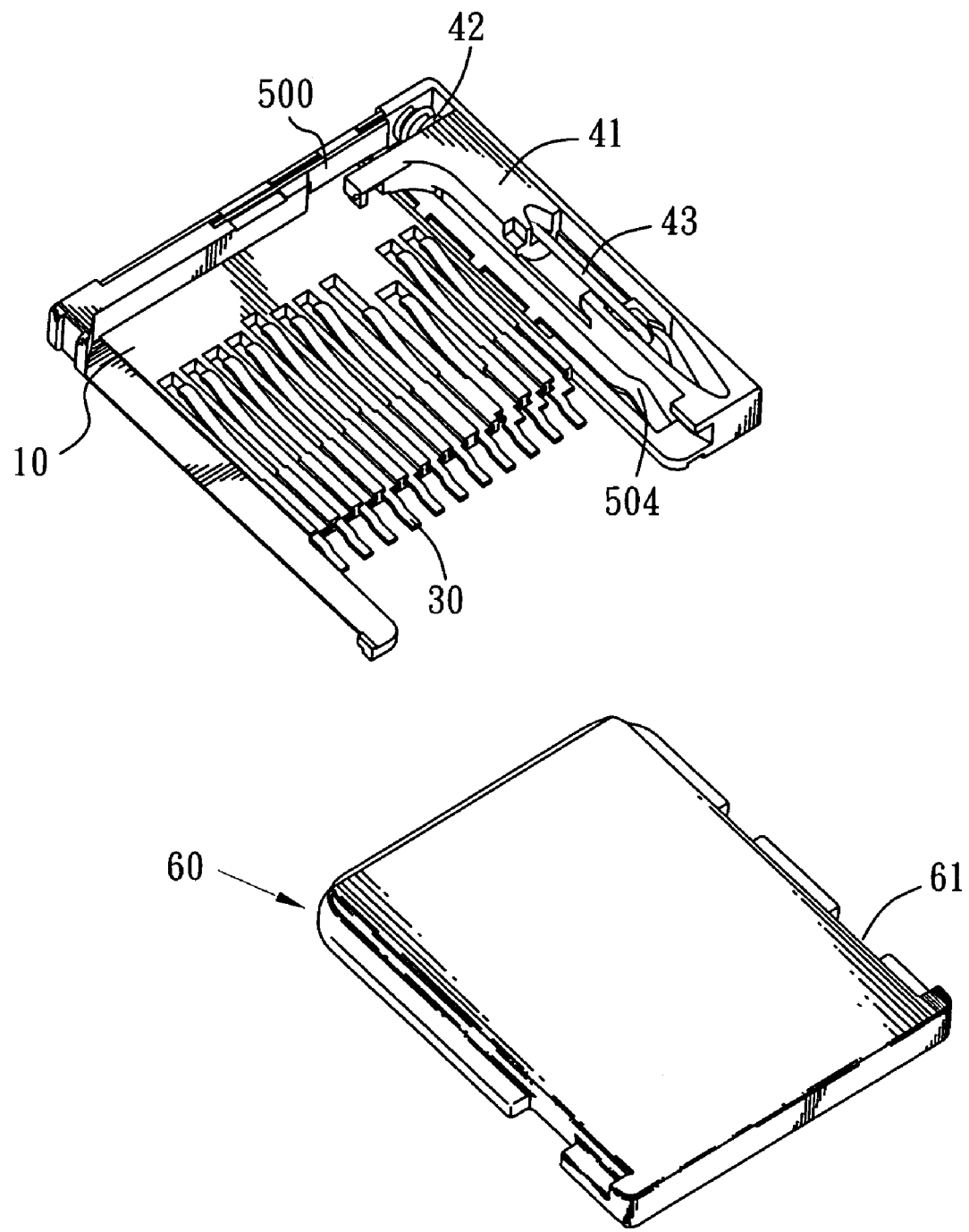
FIG. 4 is an assembled, perspective view of the card connector shown in FIG. 1, wherein a cover of the card connector is removed and an electronic card is disposed thereby.
Figure 5:
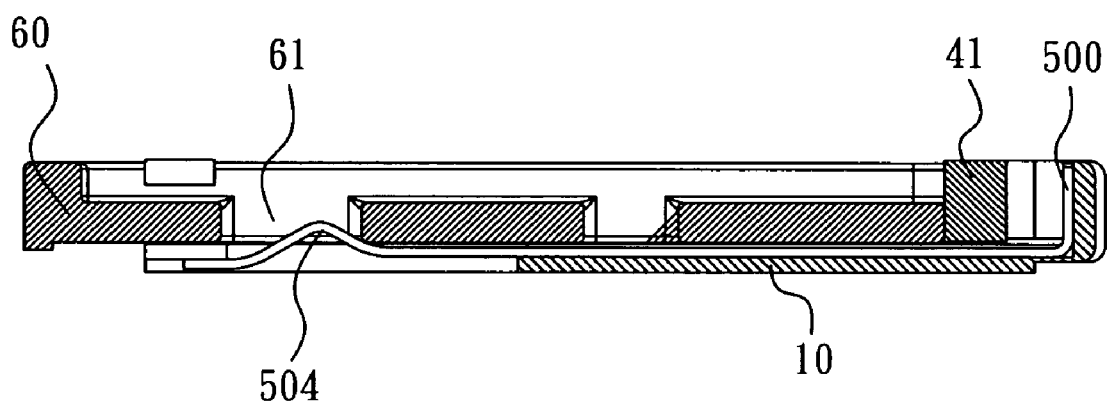
FIG. 5 is a schematic view illustrating a state of the locking element of the card connector shown in FIG. 4 blocking the inserted electronic card.

Referring to FIGS. 4-5, in assembly, the terminals 30 are respectively received in the terminal grooves 102 of the insulating housing 10. The locking element 50 and the ejecting mechanism 40 are respectively assembled to the insulating housing 10. Then the cover 20 is coupled with the insulating housing 10 to form a receiving space for accommodating an electronic card 60. When the electronic card 60 is urged to insert into the receiving space, the locking portion 504 under the electronic card 60 is against the electronic card 60 to generating a retaining force therebetween for preventing the electronic card 60 from falling out due to unexpected shake during insertion operation. When the electronic card 60 is fully inserted into the receiving space, the locking portion 504 is elastically released to insert into a recess 61 of the electronic card 60 for preventing the electronic card 60 from moving outwards. When the electronic card 60 is need to withdraw, the electronic card 60 will be pressed inwards a distance so that the eject mechanism 40 will generate a pushing force to push the electronic card 60 outwards, in this process, the locking portion 504 is also pressed downwards to result in the retaining force for preventing the electronic card 60 from flying out.

As described above, the locking element 50 is simple and independently mounted in the insulating housing 10, which not only reduces manufacture complexity, but also avoids interfering with other components because of deformation in long usage duration. In addition, the locking portion 504 is disposed under the electronic card 60 and can be pressed downwards by the electronic card 60 to enhance frictional contact therebetween for preventing the electronic card 60 from falling out due to unexpected external force during insertion and retraction.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A card connector adapted for receiving an electronic card, comprising:
    an insulating housing having a receiving recess;
    a plurality of terminals received in the insulating housing and protruded into the receiving recess for contacting the electronic card;
    an eject mechanism disposed in the insulating housing and beside the receiving recess;
    a locking element mounted in the insulating housing, the locking element having a locking plate mounted to a bottom of the receiving recess, the locking plate having a locking portion protruded upwards, the locking portion capable of being pressed downwardly by the inserted electronic card and elastically released to engage with a recess of the electronic card when the electronic card is fully inserted into the receiving recess, the locking element having a holding plate and the locking plate extending substantially perpendicular to the holding plate from a bottom edge of the holding plate, the holding plate being restrained in a slot of the insulating housing, the locking plate having an elongated shape and being placed in a locking recess formed at a bottom of the receiving recess and extending along an insertion direction, the locking portion being formed at a portion of the locking plate adjacent to a free end of the locking plate, the locking plate having a plurality of protrusions at an edge thereof corresponding to locking holes formed at a bottom of the locking recess for fixing the locking element to the insulating housing; and
    a cover coupled with the insulating housing.

2. The card connector as claimed in claim 1, wherein the locking portion is formed by means of the locking plate being arched to show a substantially smooth inverted-V shape.

3. A card connector adapted for receiving an electronic card, comprising:
    an insulating housing having a receiving recess;
    a plurality of terminals received in the insulating housing and protruded into the receiving recess for contacting the electronic card;
    an eject mechanism disposed in the insulating housing and beside the receiving recess;
    a locking element mounted in the insulating housing, the locking element having a locking plate mounted to a bottom of the receiving recess, the locking plate having a locking portion protruded upwards, the locking portion capable of being pressed downwardly by the inserted electronic card and elastically released to engage with a recess of the electronic card when the electronic card is fully inserted into the receiving recess, the locking element having a holding plate and the locking plate extending substantially perpendicular to the holding plate from a bottom edge of the holding plate, the holding plate being restrained in a slot of the insulating housing, the locking plate having an elongated shape and being placed in a locking recess formed at a bottom of the receiving recess and extending along an insertion direction, the locking portion being formed at a portion of the locking plate adjacent to a free end of the locking plate, the holding plate having a mating gap at the bottom edge thereof, a fixing piece extends downwards from an edge of the mating gap for inserting into a fixing aperture formed at a bottom of the slot for securing the locking element to the insulating housing.

* * * * *